(12) United States Patent
Dawson et al.

(10) Patent No.: US 8,206,107 B2
(45) Date of Patent: Jun. 26, 2012

(54) VARIABLE LENGTH WIND TURBINE BLADE HAVING TRANSITION AREA ELEMENTS

(75) Inventors: Mark H. Dawson, Boise, ID (US); Jack Wallace, Yucaipa, CA (US)

(73) Assignee: Frontier Wind, LLC, West Conshohocken, PA (US)

( * ) Notice: Subject to any disclaimer, the term of this patent is extended or adjusted under 35 U.S.C. 154(b) by 506 days.

(21) Appl. No.: 12/422,396

(22) Filed: Apr. 13, 2009

(65) Prior Publication Data

US 2010/0260603 A1 Oct. 14, 2010

(51) Int. Cl.
*F01D 7/00* (2006.01)
(52) U.S. Cl. ..................... 416/87; 416/223 R
(58) Field of Classification Search .............. 416/87, 416/88, 89, 155, 157 B, 158, 161
See application file for complete search history.

(56) References Cited

U.S. PATENT DOCUMENTS

| | | |
|---|---|---|
| 1,790,309 A | 1/1931 | Kientz |
| 1,922,866 A | 8/1933 | Rosenberg et al. |
| 2,485,543 A | 10/1949 | Andreau |
| 2,622,686 A | 12/1952 | Chevreau et al. |
| 3,645,141 A | 2/1972 | Moore et al. |
| 4,341,176 A | 7/1982 | Orrison |
| 4,575,309 A | 3/1986 | Brown |
| 4,582,278 A | 4/1986 | Ferguson |
| 4,692,095 A | 9/1987 | Lawson-Tancred |
| 5,106,265 A | 4/1992 | Holzem |
| 5,181,678 A | 1/1993 | Widnall et al. |
| 5,433,404 A | 7/1995 | Ashill et al. |
| 5,456,579 A | 10/1995 | Olson |
| 5,457,630 A | 10/1995 | Palmer |
| 5,527,152 A | 6/1996 | Coleman et al. |
| 5,531,407 A | 7/1996 | Austin et al. |
| 5,585,557 A | 12/1996 | Loschke et al. |
| 5,737,222 A | 4/1998 | Palmer |
| 5,796,612 A | 8/1998 | Palmer |
| 5,803,279 A | 9/1998 | Stallbaumer et al. |
| 6,002,972 A | 12/1999 | Palmer |
| 6,010,098 A | 1/2000 | Campanile et al. |
| 6,045,096 A | 4/2000 | Rinn et al. |
| 6,250,149 B1 | 6/2001 | Black |
| 6,253,126 B1 | 6/2001 | Palmer |
| 6,465,902 B1 | 10/2002 | Beauchamp et al. |

(Continued)

FOREIGN PATENT DOCUMENTS

EP 1500815 A1 1/2005

(Continued)

OTHER PUBLICATIONS

International Search Report and Written Opinion issued Jun. 7, 2010 in corresponding PCT Application No. PCT/US2010/030029.

*Primary Examiner* — Cheung Lee
(74) *Attorney, Agent, or Firm* — Banner & Witcoff, Ltd.

(57) ABSTRACT

A wind turbine blade having a longitudinal axis is provided. The wind turbine blade includes a root portion and a tip portion. The root portion has a supported end and an unsupported end. The tip portion is configured to be slidably received within the unsupported end of the root portion. A transverse gap is defined between the root portion and the tip portion. A transition element is affixed to the unsupported end of the root portion such that the transition element at least partially bridges the transverse gap. The wind turbine blade may further include blade cleaning elements and/or sensing elements, particularly in the vicinity of the transition element.

25 Claims, 11 Drawing Sheets

U.S. PATENT DOCUMENTS

| | | |
|---|---|---|
| 6,902,370 B2 | 6/2005 | Dawson et al. |
| 6,940,425 B2 | 9/2005 | Frantz |
| 7,204,694 B2 | 4/2007 | Delvecchio et al. |
| 2003/0123973 A1 | 7/2003 | Murakami |
| 2003/0223868 A1 | 12/2003 | Dawson et al. |
| 2004/0024538 A1 | 2/2004 | Severson et al. |
| 2004/0057827 A1 | 3/2004 | Pal |
| 2008/0240923 A1 | 10/2008 | Bonnet |
| 2008/0292461 A1 | 11/2008 | Stiesdal |

FOREIGN PATENT DOCUMENTS

| | | |
|---|---|---|
| JP | 53020983 A | 2/1978 |
| WO | 94-04820 A1 | 3/1994 |

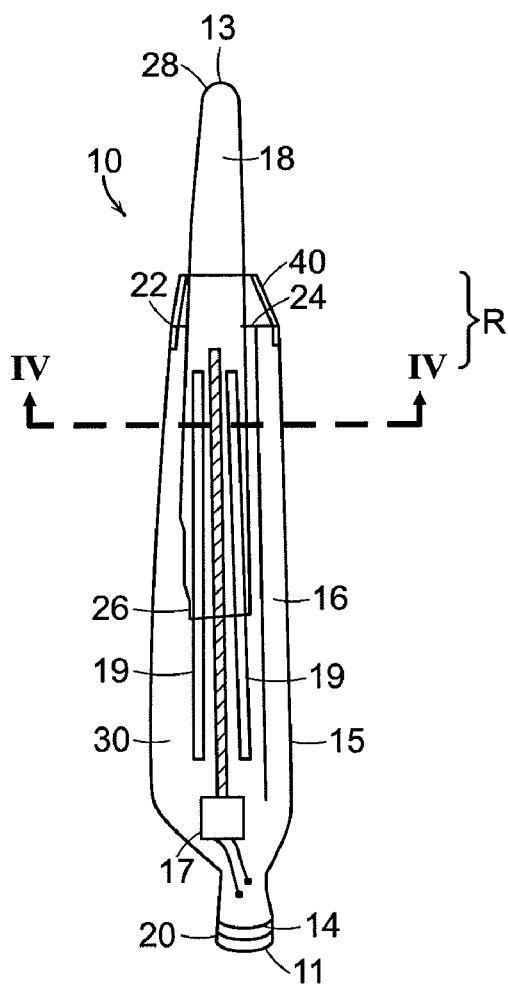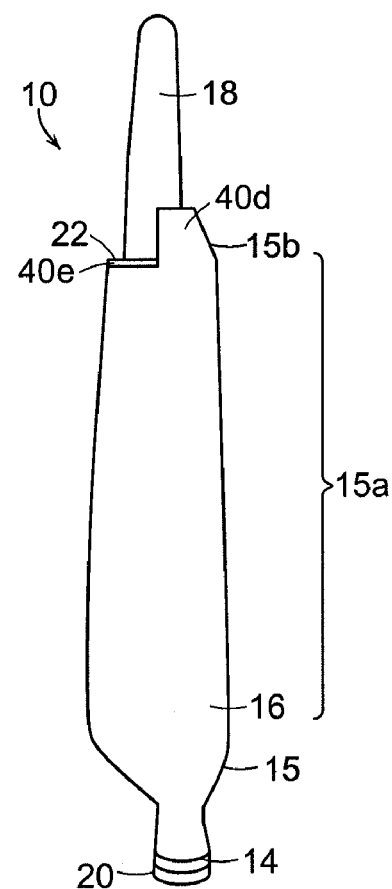
FIG. 3    FIG. 9
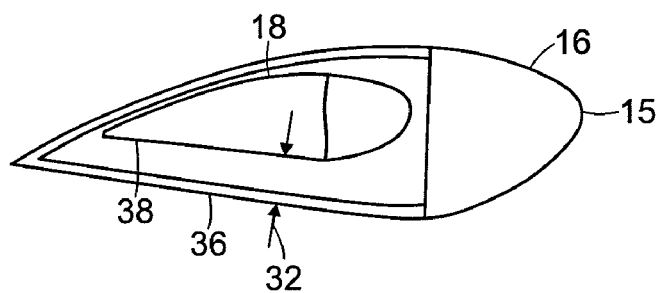
FIG. 4

VARIABLE LENGTH WIND TURBINE BLADE HAVING TRANSITION AREA ELEMENTS

FIELD OF THE INVENTION

The invention relates to a variable length wind turbine blade. Specifically, the invention relates to a variable length wind turbine blade having transition area elements.

BACKGROUND

Wind turbines create power proportional to the swept area of their blades. Increasing the length of a wind turbine's blades increases the swept area, which produces more power. A wind turbine's generator, gears, bearings, and support structure must be designed around the expected wind load and power production. At low wind speeds very long blades are desirable to get as much power as possible out of the available wind. At high wind speeds a wind turbine must control the power production and the mechanical loads developed. Eventually, if the wind speed becomes high enough, the turbine must shut down to avoid damaging components, so short blades are desirable to keep the turbine producing power in high winds.

The choice of a rotor diameter for a wind turbine is a design trade-off between energy production in low winds and load limitation in high winds. Wind turbine manufacturers often sell a variety of rotor sizes for a given wind turbine model. The rotor sizes are optimized for sites that have a low, medium, or high annual average wind speed. However, the rotor size selected is always a compromise, and there are conditions in which the turbine does not perform optimally because the rotor is too big or too small.

Disclosed in U.S. Pat. No. 6,902,370 issued Jun. 7, 2005 to Dawson, et al., entitled "Telescoping Wind Turbine Blade," and incorporated by reference herein in its entirety, is a variable length wind turbine blade that allows for a large diameter in low winds and a small diameter in high winds. This is accomplished by having a root portion and a tip portion of the blades. The tip portion may be extended or retracted relative to the root portion, depending on the amount of wind present.

A sharp transition between the tip portion and the root portion reduces aerodynamic efficiency and generates aerodynamic noise. Thus, it would be desirable to provide a smooth transition between the two blade portions.

Wind turbines, especially when using retractable blade technology, require significant amounts of monitoring and controlling. For example, the extension and retraction of the tip portions of the blades must be monitored and closely controlled to ensure that all the blades extend and retract at the same time so as to prevent an unbalanced rotor. Thus, it would be advantageous to have a method of measuring the position of the tip portion of a blade. It would also be useful to sense other parameters that provide information about the operating conditions of the blades and wind turbine.

Because of the dust and debris in the wind, turbine blades often need cleaning. In the winter, blades have a tendency to get ice build-up. Especially in the case of a variable length blade, de-icing is important because the tip portion of the blade must retract into the root portion. Thus, it would be advantageous to have a method of cleaning and de-icing blades on a variable length wind turbine.

SUMMARY

In one aspect, a wind turbine blade having a longitudinal axis is provided. The wind turbine blade includes a first blade element, a second blade element and a transition element. The first blade element has a supported end, an unsupported end, and an outer surface. The second blade element has an outer surface and is configured to be slidably received within the unsupported end of the first blade element. A transverse gap is defined between the outer surfaces of the first and second blade elements. The transition element may be affixed to the unsupported end of the first blade element. The transition element may at least partially bridge the transverse gap.

The wind turbine blade may further include a blade cleaning element, such as a wiping element, a de-icer, and an applicator. The blade cleaning element may be attached to one or more of the first blade element and the transition element. The blade cleaning element may be configured to remove unwanted material from the surface of the second blade element.

The wind turbine blade may include a sensing element. The sensing element may be attached to one or more of the first blade element, the second blade element and the transition element. The sensing element may be located in a region of the wind turbine blade where the first and second blade elements slide past one another.

In another aspect, a wind turbine blade includes a first elongated blade element and a second elongated blade element. The first elongated blade element has a leading edge extending from a supported end to an unsupported end. The leading edge is substantially linear over a majority portion of the first blade element. The second elongated blade element is slidably received into the unsupported end of the first elongated blade element. The first elongated blade element includes a transition element adjacent its unsupported end. The transition element has a leading edge that may not be aligned with the leading edge of the majority portion.

BRIEF DESCRIPTION OF THE DRAWINGS

Features and advantages according to embodiments as disclosed herein will be apparent from the following Detailed Description taken in conjunction with the accompanying drawings, in which:

FIG. 3 is a schematic plan view of a wind turbine blade with the tip portion at least partially retracted into the root portion according to the embodiment of FIG. 1.

FIG. 4 is a schematic cross-sectional view taken through section IV-IV of the wind turbine blade of FIG. 3.

FIG. 9 is a schematic view of a wind turbine blade with the tip portion at least partially retracted into the root portion according to the embodiment of FIG. 8.

DETAILED DESCRIPTION

Varying the length of a variable-length wind turbine blade changes the rotor's swept area, thereby allowing one to regulate the amount of power generated from the wind. In low wind conditions, the blade length is extended to provide a rotor with maximum swept area so that a maximum amount of power can be extracted from the wind. In high wind conditions, the blade is retracted to reduce aerodynamic loading and to keep structural loads within the design criteria.

The variable-length blade of the present disclosure includes at least a first blade element and a second blade element. The first blade element may be a root portion having a supported end that is attached to the rotor hub and having an unsupported end positioned radially outward from the supported end. The first blade element includes a cavity that provides a housing for a drive mechanism for the second blade element. The second blade element may be a tip portion having a supported end located within the cavity of the first blade element and attached to the drive mechanism and having an unsupported end located radially outward from the supported end.

The second blade element is longitudinally moveable relative to the first blade element. As the second blade element is moved longitudinally, i.e., radially inward or outward as defined by the swept area, the effective length of the blade is varied.

In these variable-length, multi-element blades, a transition region is defined where the second blade element retracts into the first blade element. This transition region provides many opportunities not found on single-element blades. For example, the transition region may be ideal for a variety of sensors and/or indicators used to collect data useful for the operation of a wind turbine. The transition region may also be ideal for the placement of cleaning devices such as de-icers to maintain clean and ice-free blades.

Figure 1:
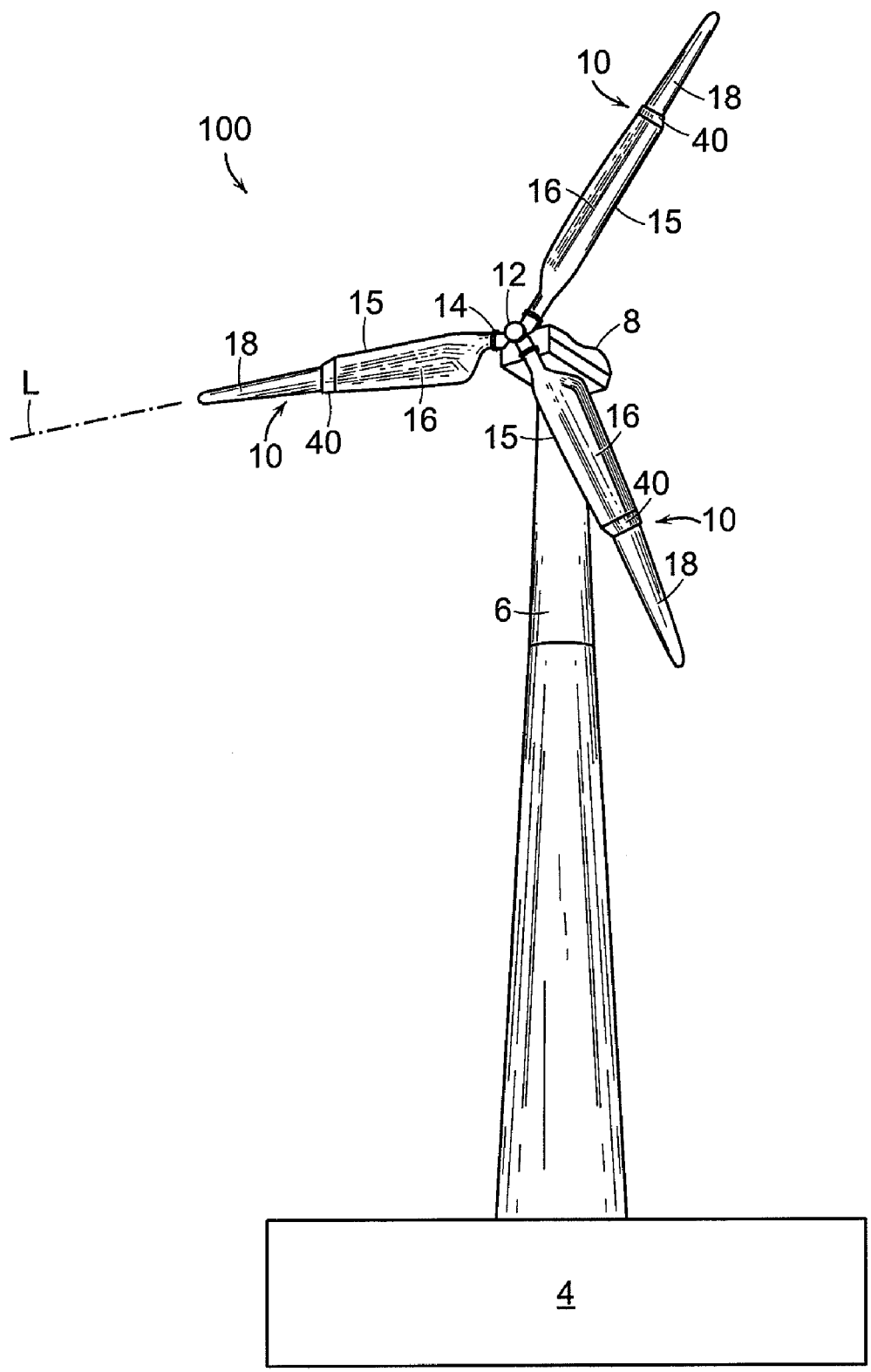
FIG. 1 shows a wind turbine with a tower and blades in an extended configuration according to an embodiment of the present disclosure.
Figure 2:
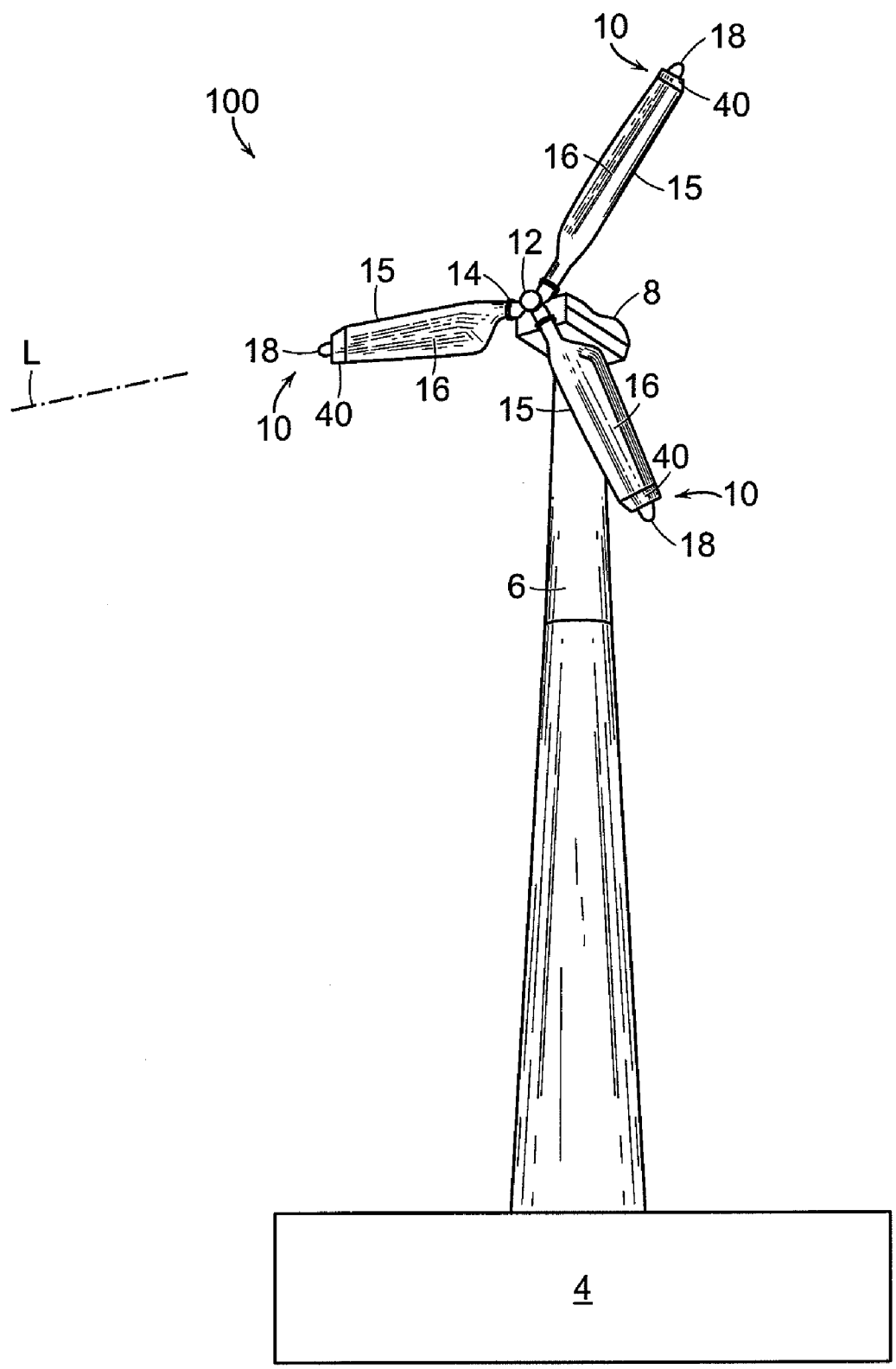
FIG. 2 shows a wind turbine with a tower and blades in a retracted configuration according to the embodiment of FIG. 1.

FIGS. 1 and 2 show a wind turbine 100 on a foundation 4 with a tower 6 supporting a nacelle 8. Multiple variable-length blades 10 are attached to a rotating hub 12. The hub 12 is connected to a drive train (not shown) within the nacelle 8. Blade 10 defines a longitudinal axis (L) generally aligned along the radius of a circular area swept out by blade 10 when it rotates.

Referring to FIG. 3, blade 10 has an attachment end 11 and a free end 13. Between attachment end 11 and free end 13, blade 10 generally has an aerodynamically-shaped profile (see FIG. 4) that gets smaller as it approaches free end 13.

Referring back to FIG. 3, blade 10 may be a two-piece blade having a root portion 16 and a tip portion 18. Blade 10 may be formed, by way of non-limiting example, of composite epoxy laminated materials (including fiberglass, carbon, aramid, basalt etc. fibers that are woven, stranded, matted, chopped, etc.), plastics (including filled and unfilled thermoplastics), laminated wood, metals, and/or any combination thereof.

Root portion 16 is a generally elongated blade element extending from a first end 20 to a second end 22. The first, supported, end 20 is configured for attachment to hub 12. A metal fitting, such as a bolt flange 14 or studs, may be attached to first supported end 20 to assist in the attachment of root portion 16 to hub 12. The second, unsupported, end 22 has an opening 24 configured to receive tip portion 18.

Tip portion 18 is also a generally elongated blade element extending from a first end 26 to a second end 28. In this embodiment, the first end 26 is a supported end and the second end 28 is an unsupported end. Tip portion 18 may be hollow or solid.

Tip portion 18 is configured to longitudinally extend from (see FIG. 1) or retract into (see FIG. 2) root portion 16. During the longitudinal extension or retraction of tip portion 18, rotating, pivoting and/or even some lateral movement of tip portion 18 relative to root portion 16 may also occur.

As best seen in FIG. 3, root portion 16 defines a cavity 30 for accommodating tip portion 18 as it is retracted into root portion 16. Cavity 30 further accommodates at least one drive mechanism 17, attached to both tip portion 18 and root portion 16, for extending and/or retracting tip portion 18 relative to root portion 16. Cavity 30 further accommodates at least a portion of a guide mechanism 19 for guiding tip portion 18 as it extends and/or retracts relative to root portion 16.

As best seen in FIG. 4, between the outer surface 36 of root portion 16 and the outer surface 38 of tip portion 18, a lateral or transverse gap 32 is defined. Typically, the transverse dimension of gap 32 is not constant around the perimeter of the blade portions. Further, the transverse dimension of gap 32 generally varies as tip portion 18 slides into and out of root portion 18. Referring back to FIG. 3, a transition region (R) is defined where root portion 16 meets tip portion 18 of blade 10.

Figure 5A:
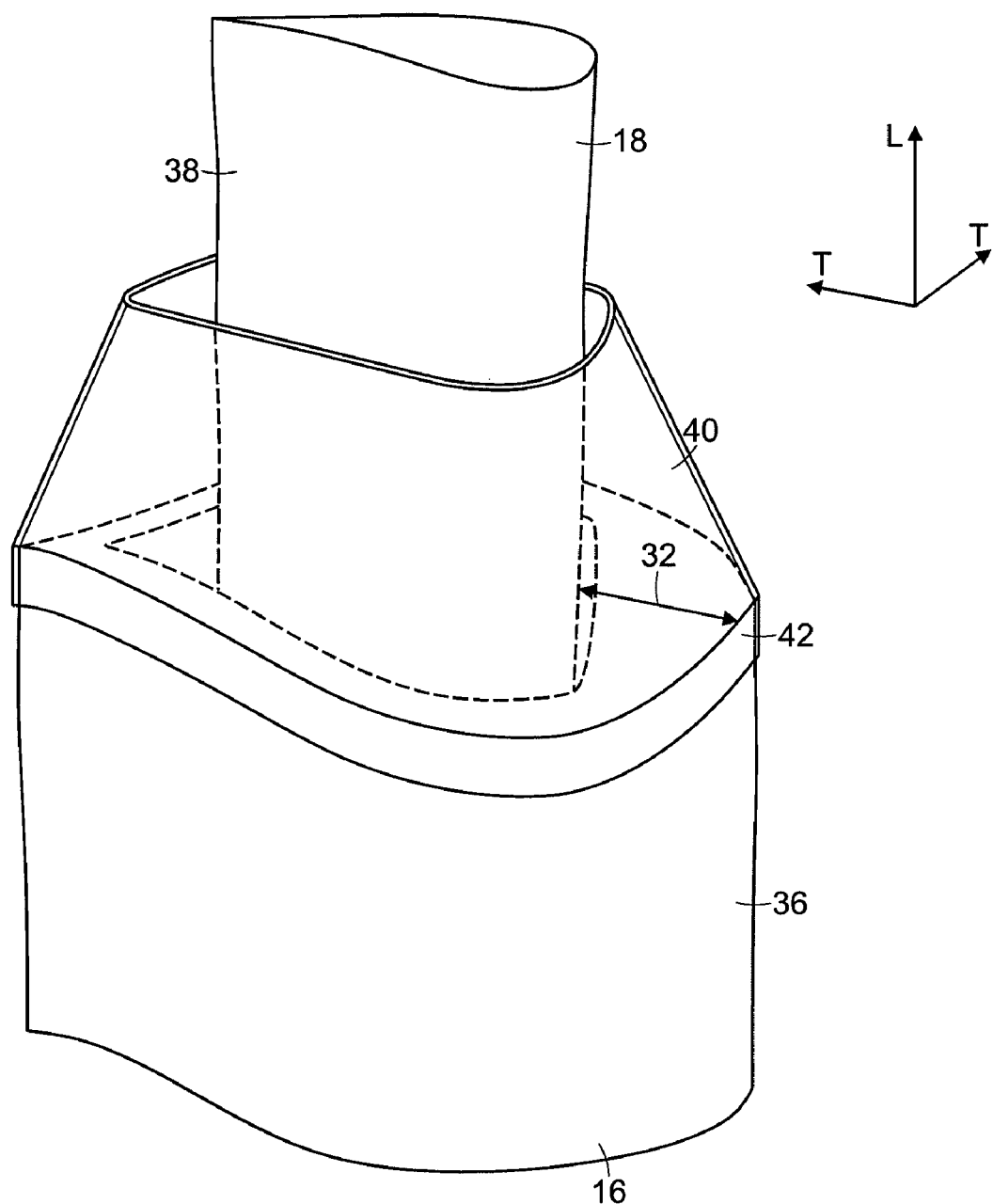
FIG. 5A is a schematic perspective view of a portion of a wind turbine blade illustrating a transition element according to an embodiment of the present disclosure.

In FIGS. 3 and 5A-5C, a transition element 40 is shown affixed to root portion 16. As shown in FIG. 5A, transition element 40 may be a relatively thin, flexible, rubber-like boot element having a mounting portion 42 that extends over outer surface 36 of root portion 16. Transition element 40 may be adhesively or otherwise fastened to root portion 16.

Transition element 40 at least partially bridges transverse gap 32. In some embodiments, transition element 40 may completely bridge gap 32, such that transition element 40 contacts outer surface 38 of tip portion 18. Further, in certain embodiments and as shown in FIGS. 3 and 5A, transition element 40 not only extends laterally or transversely (T) towards tip portion 18 but also extends longitudinally (L) beyond the unsupported end of root portion 16. Thus, transition element 40 may extend inward at an angle (both longitudinally and transversely), thereby smoothing the transition between the two blade portions and improving the aerodynamic efficiency of blade 10. Transition element 40 may also serve to inhibit the entry of any dirt, debris, insects, water, ice or other unwanted matter into cavity 30 of root portion 16.

Figure 5B:
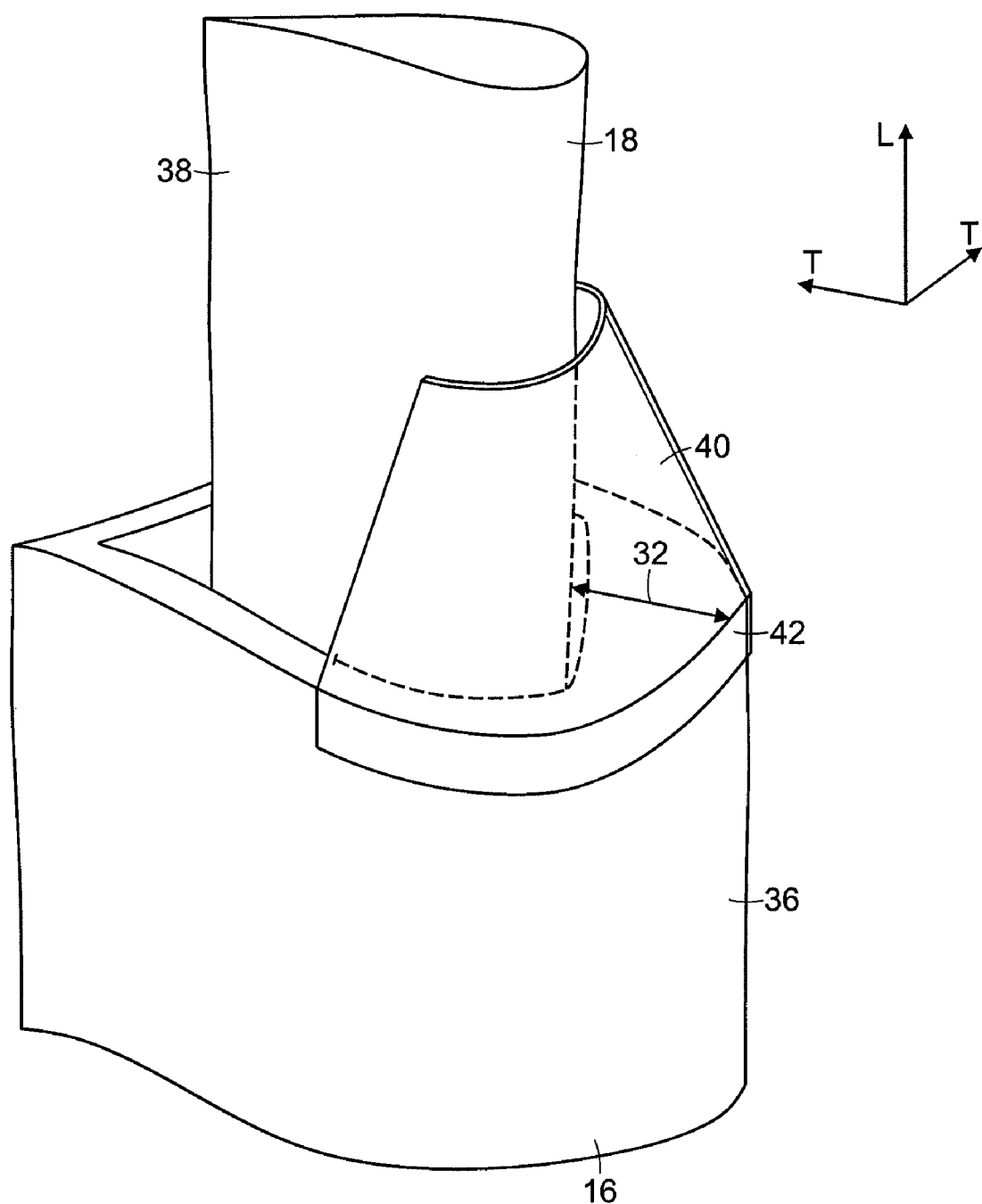
FIG. 5B is a schematic perspective view of a portion of a wind turbine blade illustrating a transition element according to another embodiment of the present disclosure.
Figure 5C:
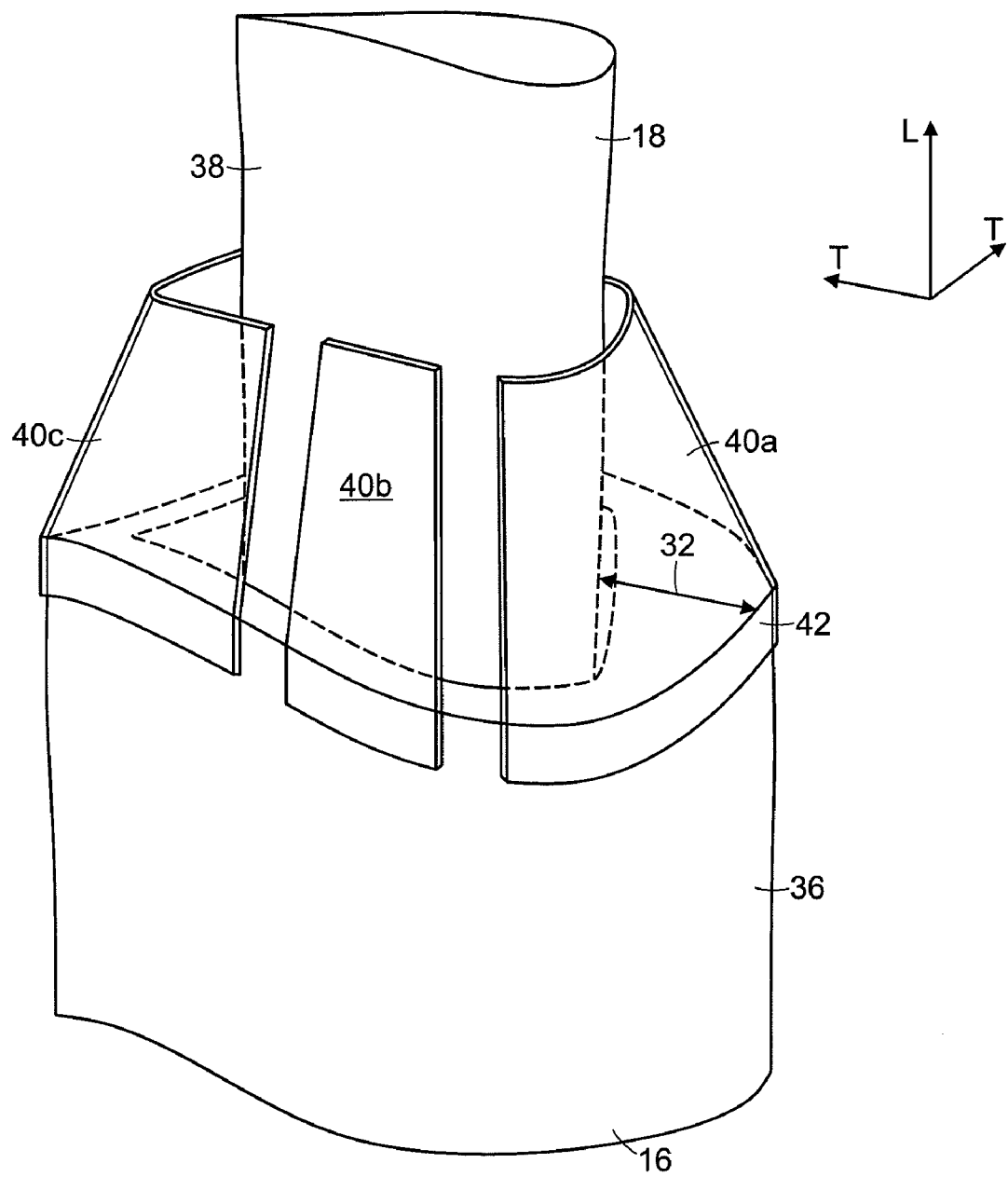
FIG. 5C is a schematic perspective view of a portion of a wind turbine blade illustrating a transition element according to even another embodiment of the present disclosure.

Transition element 40 may completely encircle tip portion 18, as shown in FIG. 5A. Transition element 40, at its supported end, follows the aerodynamic shape of root portion 16 and, at its free end, at least approximately follows the aerodynamic shape of tip portion 18. Thus, transition element 40 may be considered to be aerodynamically configured. In an alternative embodiment, as shown in FIG. 5B, transition element 40 may extend around only a part of tip portion 18. In certain embodiments, as best shown in FIG. 5C, multiple transition elements, 40a, 40b, 40c, may be located in the transition region. Although transition elements 40a, 40b, 40c are shown in FIG. 5C as being non-overlapping, in other embodiments, some or all of the transition elements may overlap (or abut) one another.

Transition element 40 may be formed of rigid or flexible materials or a combination thereof. Thus, by way of non-limiting example, transition element 40 may be formed of the same material that is used to form root portion 16. Further, transition element 40 may be formed, at least partially, of a material capable of elastically deforming such that any change in the cross-section and/or position of tip portion 18, as it moves relative to root portion 16, may be accommodated.

Thus, in certain embodiments, as shown in FIGS. 6A-6D, transition element 40 may include a mounting portion 42, an elastically deformable element 44 and an elongated portion 46. Mounting portion 42 and elongated portion 46 may be formed of a relatively rigid material. Elastically deformable element 44 may be a biasing element such as a leaf spring, torsion spring, etc. that biases the elongated portion 46 against outer surface 38 of tip portion 18.

Figure 6B:
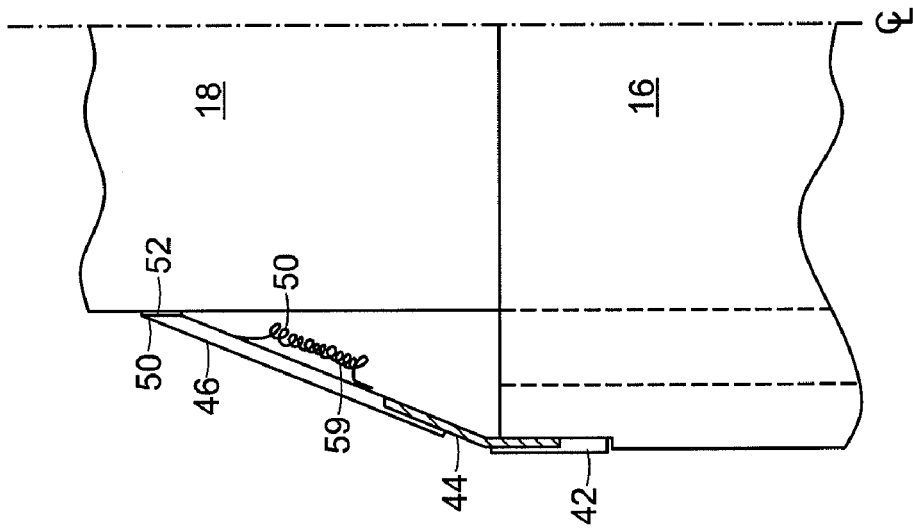
FIG. 6B is a schematic plan view of a portion of a wind turbine blade illustrating a blade cleaning element according to another embodiment of the present disclosure.
Figure 6A:
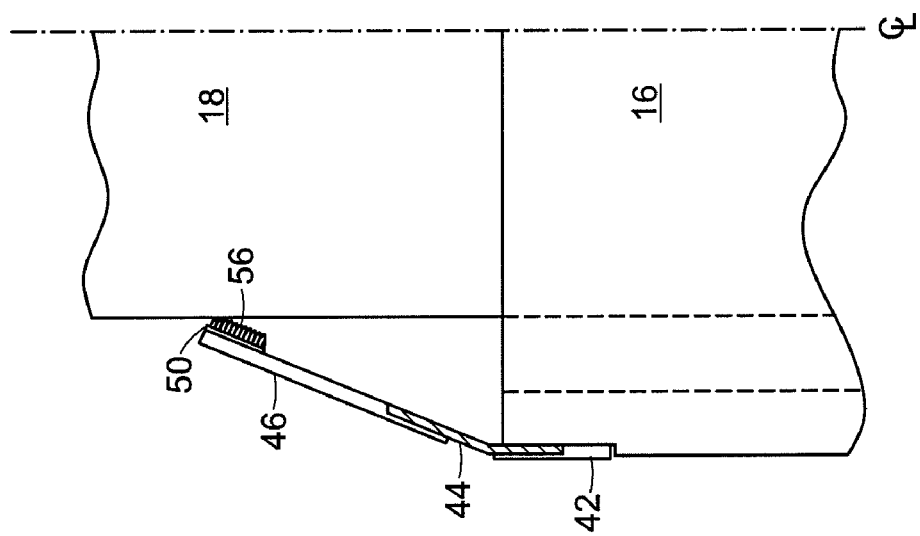
FIG. 6A is a schematic plan view of a portion of a wind turbine blade illustrating a blade cleaning element according to an embodiment of the present disclosure.
Figure 6D:
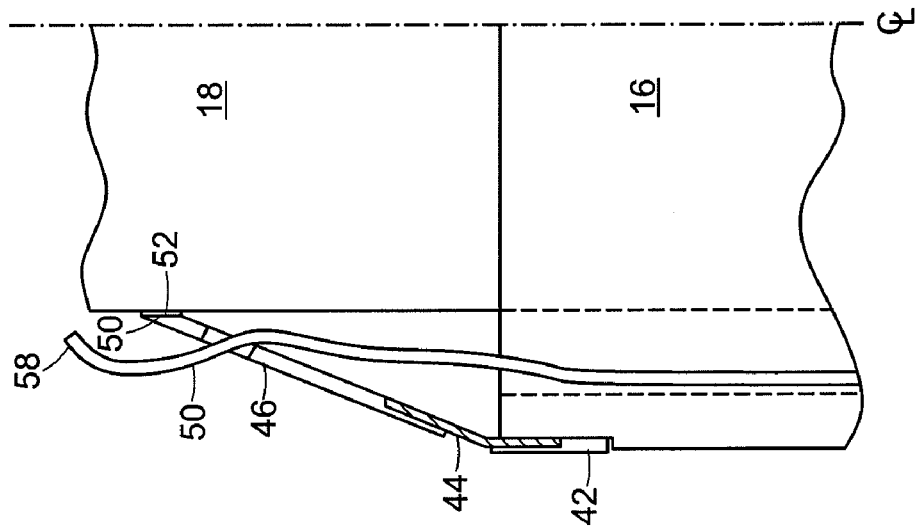
FIG. 6D is a schematic plan view of a portion of a wind turbine blade illustrating a blade cleaning element according to a further embodiment of the present disclosure.
Figure 6C:
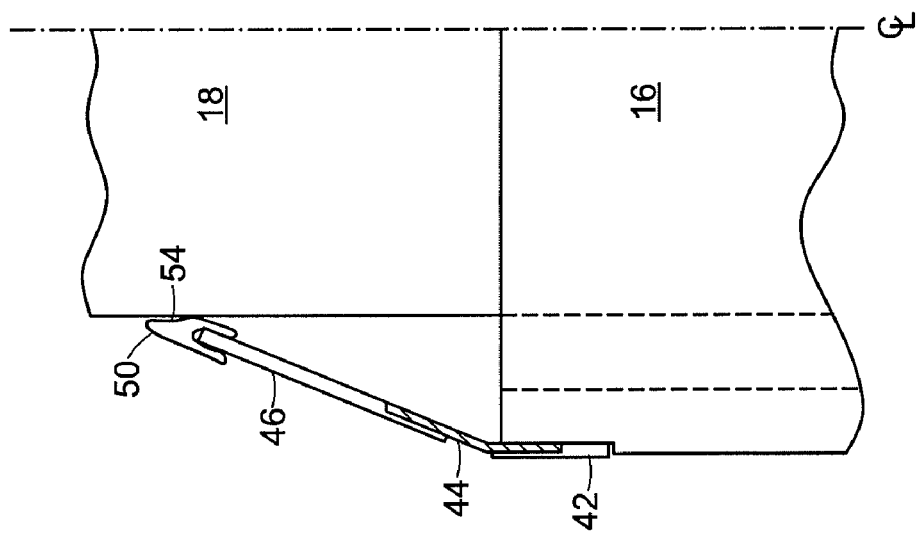
FIG. 6C is a schematic plan view of a portion of a wind turbine blade illustrating a blade cleaning element according to even another embodiment of the present disclosure.

One or more blade cleaning elements 50 may be attached to transition element 40. For example, as best shown in FIG. 6A, a brush-like element 56 having bristles may be attached to elongated portion 46. Brush-like element 56 may be particularly suitable for cleaning dirt and/or dry debris from the surface of tip portion 18 as tip portion 18 moves relative to root portion 16 and transition element 40. As best shown in FIG. 6B, the free end of elongated portion 46 may be shaped as a scraper 52, such as may be suitable for scraping ice or other unwanted matter from outer surface 38 when tip portion 18 is moved relative to root portion 16. As another example, as best shown in FIG. 6C, an elastomeric wiping element 54, such as a squeegee or other sealing-type element, may be attached to elongated portion 46. Wiping element 54 may clean dirt and/or water from tip portion 18. In another embodiment, as best shown in FIG. 6D, blade 10 may include an applicator 58. Applicator 58 may be a tube configured to dispense, by way of non-limiting example, a cleaning solution, a de-icing solution, etc. Further, one or more blade cleaning elements 50 may be supplied in combination. Thus, as shown in FIG. 6D, scraper 52 is supplied in conjunction with applicator 58. Both scraper 52 and applicator 58 may be de-icing devices. As even another example, as shown in FIG. 6B, blade cleaning element may be a heating element 59 configured to clean the blade of ice. Heating element 59 may be an electrically resistive heating element, such as a thermistor.

Figure 7B:
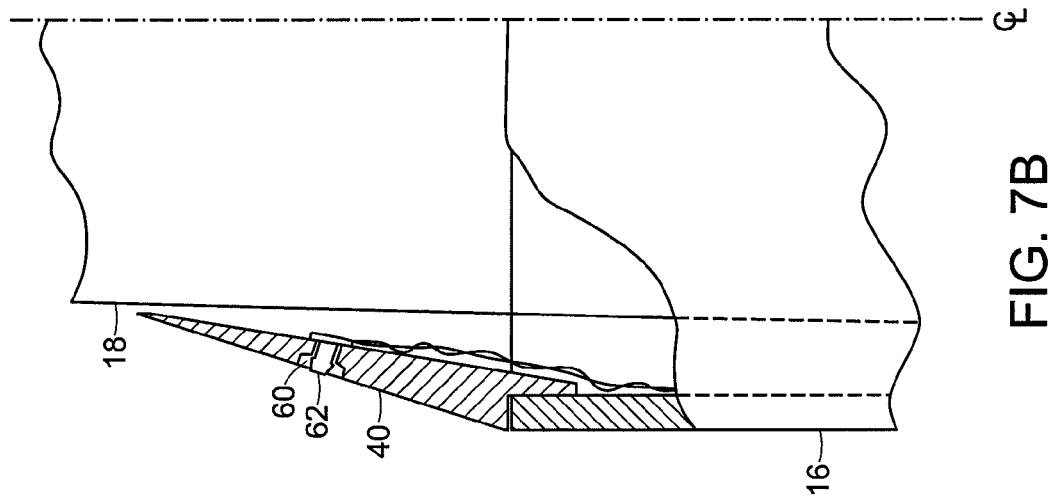
FIG. 7B is a schematic plan view of a portion of a wind turbine blade illustrating a sensing element according to another embodiment of the present disclosure.
Figure 7A:
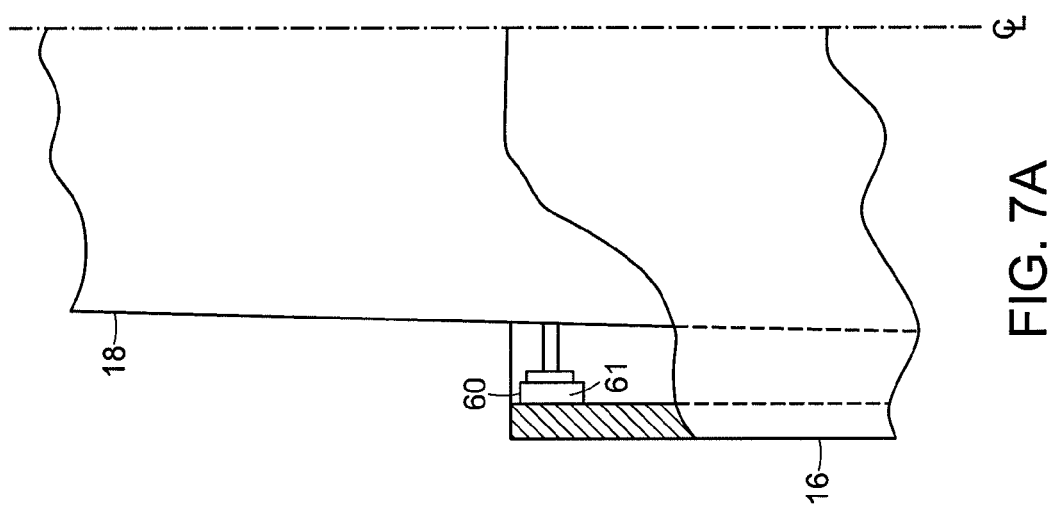
FIG. 7A is a schematic plan view of a portion of a wind turbine blade illustrating a sensing element according to an embodiment of the present disclosure.

Multi-element wind turbine blades provide a unique opportunity to measure stress, flexure, relative position, load and other blade properties. By way of non-limiting examples, and as shown in FIGS. 7A-7C sensing elements 60 may be provided in the transition region(s) of multi-element blades. For example, in FIG. 7A, sensing element 60 is located adjacent the unsupported end of root portion 16 and between root portion 16 and tip portion 18. In FIG. 7B, sensing element 60 is attached to transition element 40. In FIG. 7C, sensing element 60 has multiple sensing element components—a first sensing element component 60a attached to root portion 16 and second and third sensing element components 60b, 60c attached to tip portion 18.

Sensing elements 60 may sense or provide information (i.e., data) for various different properties. For example sensing element 60 may sense displacement, velocity and/or acceleration of the blade portions. Sensing elements may further be used to sense or provide information on relative blade displacements, velocities and/or accelerations, i.e. measuring the movement of tip portion 18 relative to root portion 16. The sensed displacements, velocities or accelerations may be linear (e.g., substantially longitudinal or transverse) and/or angular (e.g., rotational around the longitudinal axis, pivotal in the plane of the swept area, or pivotal out of the plane of the swept area). In other embodiments, sensing element 60 may be used to sense a pressure or a load applied to a blade portion. The pressure or loads may be due to wind pressure or to one blade portion contacting another. In even another embodiment, sensing element 60 may sense a stress or strain within an element or a blade portion. Further, environmental data may be sensed by the sensing element(s) 60, including temperature, humidity, wind speed, air flow pressures, etc.

In certain embodiments, a single sensing element 60 may supply several pieces of information. For example, an accelerometer may measure acceleration, which may then be used to determine velocities and displacements. The sensed data may be collected during steady state and/or during transitional operation of the wind turbine. Further, the sensed data may be used for real-time control of the wind turbine or to collect data for future design purposes.

As shown in FIG. 7A, blade 10 may include sensing element 60 located in a region where root and tip portions 16, 18 slide past one another. Sensing element 60 may be located between root portion 16 and tip portion 18. By way of a non-limiting example, a linear variable differential transformer (LVDT) 61 may be mounted to an inside surface of root portion 16 and configured to measure a relative transverse displacement of tip portion 18 to root portion 16. Further, multiple LVDTs 61 may be located on blade 10 to measure displacement at more than one location and/or in more than one direction.

In the embodiment shown in FIG. 7B, sensing element 60 (or a component of sensing element 60) may be attached to transition element 40. Thus, by way of non-limiting example, a thermocouple 62 may be located on transition element 40.

In the embodiment of FIG. 7C, sensing element 60 includes a plurality of sensing element components 60a, 60b, 60c. A first sensing element component 60a is attached to root portion 16; second and third sensing element components 60b, 60c are attached to tip portion 18. By way of non-limiting example, sensing element 60 may include a magnetic proximity sensor switch 64 attached to an inner surface of root portion 16 and magnetic targets 65a, 65b attached to an outer surface of tip portion 18. Magnetic targets 65a, 65b are spaced apart in a longitudinal direction. Such a sensing element configuration may be suitable, for example, for sensing travel limits of tip portion 18 relative to root portion 16.

In certain embodiments, sensing element 60 may also function as a safety element, providing information to a control system when travel, load, strain, temperature, etc. limits have been reached. In even other embodiments, sensing element may also function as a switch, not only sensing information, but also triggering an event. Thus, by way of non-limiting example, sensing element may include a first component in the form of an actuator and a second component in the form of a trigger, such that when the actuator contacts the trigger, a signal is sent to the control system to take a specific action. The actuator may, for example, be a protrusion extending from transition element 40, root portion 16 or tip portion 18 and the trigger may be a trip or break-away wire.

Materials used to make wind turbine blades, such as fiberglass, typically lend themselves to embedding other materials or sensors within the matrix of the blade. Thus, sensing elements or components of sensing elements may be embedded in the walls of the root or tip portions 16, 18. For example, switch 64 may be mounted on the root portion 16 and magnetic targets 65a, 65b may be embedded in wall of tip portion 18. Alternatively (not shown), switch 64 may be embedded in tip portion 18 and magnetic targets 65a, 65b may be mounted to a surface of, or embedded in, root portion 16. Other items, such as strain gauges, reflectors, etc. may be embedded to protect the sensing component or to provide a surface free of protrusions or attachments.

A person of ordinary skill in the art, given the benefit of this disclosure, would recognize that many other sensors may be placed in the transition region, including, without limitation, micrometers, potentiometers, accelerometers, strain gauges, dial indicators, angle indicators, linear movement indicators, encoders, optical devices, laser devices, ultrasonic devices, pressure bulbs, etc. Other conceivable possibilities for sensing information include an air bleeder port, limit switches, inductive switches, camera/logical comparisons, rheostats, piezoelectric technology, capacitance, infrared sensors, microwave, or fiber optic technology. Information received from sensing element 60 may be used as input for the control of wind turbine 2 and/or may provide valuable insight into the operating conditions.

Figure 7D:
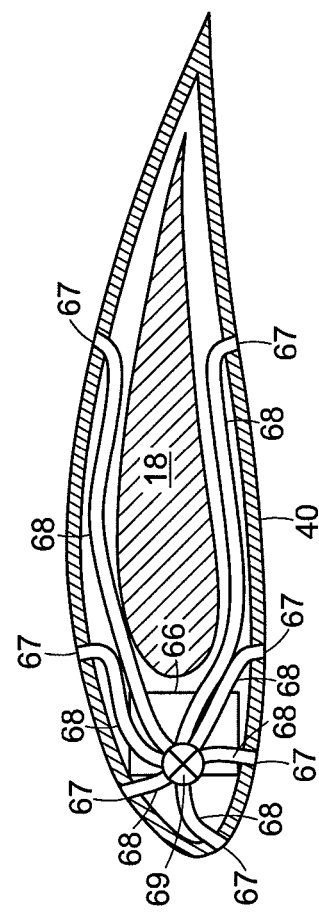
FIG. 7D is a schematic cross section view of a portion of a wind turbine blade illustrating sensing elements according to a further embodiment of the present disclosure.
Figure 7C:
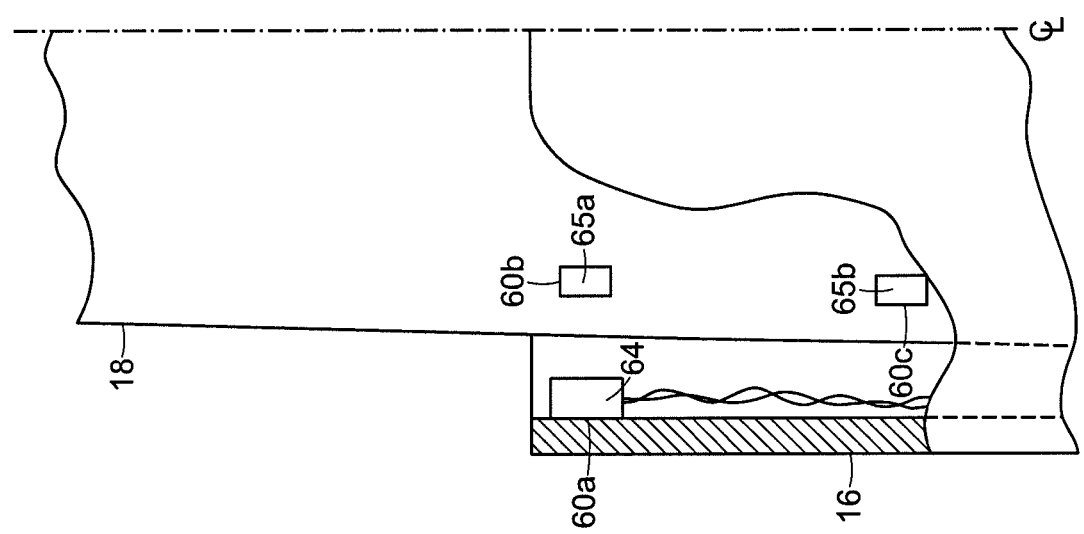
FIG. 7C is a schematic plan view of a portion of a wind turbine blade illustrating a sensing element according to a further embodiment of the present disclosure.

Thus, for example, referring to FIG. 7D, an absolute or differential pressure transducer 66 may be used to measure air flow pressures at the surface of the transition element 40. In one aspect, multiple orifices or ports 67 may be distributively provided on the surface of the transition element 40. Tubing 68 may connect each port to a pressure transducer 66. Each port could be measured by means of a scanning valve 69 associated with a pressure transducer, or alternatively, each port could be associated with its own individual pressure transducer (not shown). Measuring surface pressures may allow for the measurement or estimation of aerodynamic forces acting on the blade in the vicinity of the transition element 40.

Figure 8:
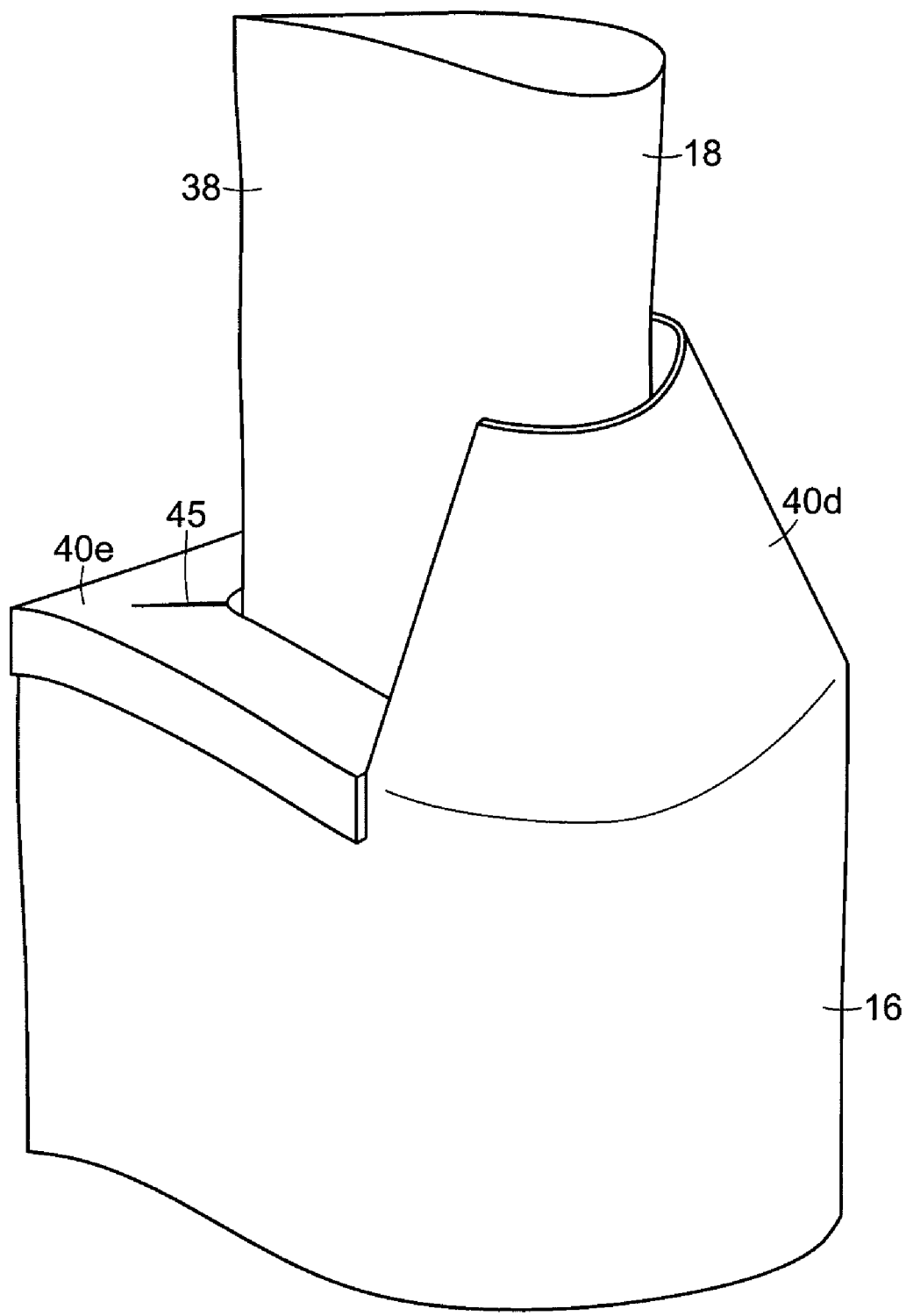
FIG. 8 is a schematic perspective view of a portion of a wind turbine blade illustrating a transition element according to an embodiment of the present disclosure.

In another embodiment, as shown in FIGS. 8 and 9, transition element 40d may be integrally formed with root portion 16. Referring to FIG. 9, item 15 refers to a leading edge extending from supported end 20 to unsupported end 22 of root portion 16. Leading edge 15 includes a substantially linear portion 15a that extends over a majority of root portion 16. Leading edge 15 further includes a transition portion 15b, located at the unsupported end 22. In this specific embodiment, transition portion 15b is not linearly aligned with the substantially linear portion 15a that extends over a majority of root portion 16. Transition element 40d is essentially defined as the region having transition portion 15b.

Transition element 40d may extend completely around tip portion 18 or only partially (as shown in FIG. 8). Transition element 40d may be formed of the same materials as root portion 16, although the details of the lay-up (in the case of a composite laminate) in transition element 40d may depart from the lay-up in root portion 16. Optionally, transition element 40d may include one or more materials that differ from those used to form root portion 16. Further, as also shown in FIG. 8, one or more additional transition element(s) 40e may be attached to root portion 16. In this particular embodiment, transition element 40e at least partially bridges the gap between the outer surface of root portion 16 and the outer surface of tip portion 18 by extending substantially transversely to the longitudinal axis of blade 10. Transition element 40e is mounted to an exterior surface of root portion 60. In this embodiment, transition element 40e is formed of a flexible elastomeric material and further includes a slit 45 to provide additional flexibility. Blade cleaning elements 50 and sensing elements 60 may be located on transition elements 40d and/or 40e as disclosed above.

The present invention has been described in terms of preferred and exemplary embodiments thereof. Numerous other embodiments, modifications and variations within the scope and spirit of the appended claims will occur to persons of ordinary skill in the art from a review of this disclosure. Thus, for example, blade 10 may be composed of more than two blade elements. As another example, the unsupported end of the root portion may be slidably received by the unsupported end of the tip portion, i.e., the tip portion may slide over the root portion. Further, certain elements shown as mounted on root portion 16 and/or tip portion 18 may be mounted on transition element 40, or vice versa, as part of certain design variations. Even further, suitable mounting configurations and methods, such as whether the elements are mounted on outer or inner surfaces, or are removably or permanently attached, would be apparent to persons of ordinary skill in the art, given the benefit of this disclosure. All examples, whether preceded by "for example," "such as," "including," or other itemizing terms or followed by "etc.," are meant to be non-limiting examples, unless otherwise stated or obvious from the context of the specification.

What is claimed is:

1. A wind turbine blade having a longitudinal axis, the wind turbine blade comprising:
    a first blade element having a supported end, an unsupported end, a leading edge longitudinally extending therebetween, and an outer surface;
    a second blade element having an outer surface and configured to be slidably received within the unsupported end of the first blade element; and
    a transition element extending from the unsupported end of the first blade element, wherein the transition element has a longitudinally extending leading edge that is angled relative to the longitudinally extending leading edge of the first blade element.

2. The blade of claim 1, wherein, adjacent to the unsupported end of the first blade element, the transition element has an aerodynamically-shaped outer surface that follows an aerodynamically-shaped outer surface of the first blade element.

3. The blade of claim 1, wherein the longitudinally extending leading edge of the transition element is angled from a longitudinally extending leading edge of the second blade element.

4. The blade of claim 1, wherein the transition element is fastened to the first blade and is at least partially flexible.

5. The blade of claim 1, wherein the transition element at least substantially encircles the second blade element.

6. The blade of claim 1, further comprising:
    a blade cleaning element, wherein at least a component of the blade cleaning element is attached to the transition element.

7. The blade of claim 1, further comprising:
    a sensing element located in a region of the wind turbine blade where the first and the second blade elements slide past one another.

8. The blade of claim 1, further comprising:
a sensing element, wherein at least a component of the sensing element is attached to the transition element.

9. A wind turbine blade comprising:
a first blade element;
a second blade element; and
a blade cleaning element attached to the first blade element and configured to remove unwanted material from a surface of the second blade element.

10. The blade of claim 9, wherein the wind turbine blade defines a longitudinal axis and the second blade element is configured to slide, substantially longitudinally, into the first blade element, and wherein the blade cleaning element is located between the first and second blade elements.

11. The blade of claim 9, wherein the first blade element includes a transition element extending from an unsupported end, wherein at least a component of the blade cleaning element is attached to the transition element.

12. The blade of claim 9, wherein the blade cleaning element includes a wiping element configured to at least partially wipe against the second blade element when the second blade element slides relative to the first blade element.

13. The blade of claim 9, wherein the blade cleaning element includes an applicator for applying a cleaning solution to the second blade element.

14. The blade of claim 9, wherein the blade cleaning element includes a de-icer.

15. A wind turbine blade defining a longitudinal axis, the wind turbine blade comprising:
a first blade element having a supported end, an unsupported end and a leading edge longitudinally extending therebetween;
a second blade element, wherein the second blade element is configured to slide, substantially longitudinally, into the first blade element;
a transition element extending from the unsupported end of the first blade element and having a longitudinally extending leading edge that is angled relative to the longitudinally extending leading edge of the first blade element; and
a sensing element having at least one component located within the transition element.

16. The blade of claim 15, wherein the transition element is fastened to the unsupported end of the first blade element, and wherein at least a component of the sensing element is attached to the transition element.

17. The blade of claim 15, wherein the sensing element senses at least one of a pressure and a load between the first blade element and a second blade element.

18. The blade of claim 15, wherein the sensing element senses at least one of a stress and a strain.

19. The blade of claim 15, wherein the sensing element senses a temperature.

20. The blade of claim 15, wherein the sensing element senses an air pressure.

21. The blade of claim 15, wherein the sensing element senses at least one of a relative displacement, velocity and acceleration between the first blade element and the second blade element.

22. The blade of claim 15, wherein the sensing element provides input information to a control system of the wind turbine.

23. The blade of claim 1, wherein the transition element is fastened to the first blade and is configured to accommodate a change in cross-section of the second blade relative to the first blade.

24. The blade of claim 1, wherein the transition element is flexibly biased against the outer surface of the second blade.

25. The blade of claim 1, wherein the transition element has a longitudinally extending trailing edge that is angled relative to a longitudinally extending trailing edge of the first blade element.

* * * * *